United States Patent [19]

Thomas

[11] 4,371,643

[45] Feb. 1, 1983

[54] PARTICLE SIZE REDUCTION OF PIGMENTS BY NON-SALT MILLING

[75] Inventor: Daniel W. Thomas, Bridgewater, N.J.

[73] Assignee: American Cyanamid Co., Stamford, Conn.

[21] Appl. No.: 297,584

[22] Filed: Aug. 31, 1981

Related U.S. Application Data

[63] Continuation-in-part of Ser. No. 174,397, Jul. 31, 1980, abandoned.

[51] Int. Cl.³ .............................................. C08L 39/04
[52] U.S. Cl. ..................................... 524/88; 524/90; 106/288 Q; 546/49

[58] Field of Search ................. 260/29.6 HN, 33.4 R; 524/90, 88

[56] References Cited

U.S. PATENT DOCUMENTS 4,127,422 11/1978 Guzi, Jr. et al. ........... 260/29.6 RW

*Primary Examiner*—Joseph L. Schofer
*Assistant Examiner*—N. Sarofin
*Attorney, Agent, or Firm*—Bruce F. Jacobs

[57] ABSTRACT

Pigment compositions prepared from a pigment, a hydroxylic solvent, and a polar polymer may be reduced in particle size by grinding in the absence of a salt to produce a pigment which may be used "as is" without any subsequent treatment.

5 Claims, No Drawings

PARTICLE SIZE REDUCTION OF PIGMENTS BY NON-SALT MILLING

Cross-Reference to Related Application

This is a continuation-in-part of U.S. Ser. No. 174,397, filed July 31, 1980 now abandoned.

This invention relates to pigment compositions and, more particularly, to dry pigment compositions and a process for the production thereof by dry milling crude pigments in the absence of a salt-grinding aid and in the presence of (a) a hydroxylic solvent and (b) a polar polymer.

Attempts to reduce the particle size of crude organic pigments to a useful form by merely grinding them in the dry state without the inclusion of grinding aids or agents have been without success in the past. For instance, with either a crude copper phthalocyanine pigment or a crude quinacridone pigment is ground (for example, ball milled) in the dry state in the absence of any added inert substance, such as sodium chloride or borax, there is no evidence of any substantial reduction in the particle size when examined by any of the tests usually applied to such pigments. This behavior is particularly pronounced when the grinding is done in a ball mill. In fact, it has even been observed that a small particle-size copper phthalocyanine pigment, finished by other known methods, will revert mostly to the properties of the crude pigment when subjected to dry grinding in a ball mill.

Many references have disclosed procedures whereby the essentially valueless products obtained by dry milling are conditioned in a second wet-finishing step consisting of agitating the dry milled crude pigment in the presence of a suitable organic liquid, the resulting isolated pigments exhibiting the required particle size reduction. For example, U.S. Pat. No. 2,857,400 uses a relatively large amount of an organic liquid and homogenizes the pigment slurry with violent agitation in order to reduce the particle size. U.S. Pat. No. 3,017,414 has a second step comprising agitation of the crude dry-milled pigment in an aqueous emulsion of certain organic liquids boiling between 100° C. and 250° C. (the liquids are called breaching agents), followed by removal of the liquids, preferably by steam distillation. In a similar manner, U.S. Pat. No. 4,024,154 agitates the crude dry-milled pigment in an aqueous emulsion of an aliphatic hydrocarbon derived from petroleum and boiling between 50° C. and 180° C. British Pat. No. 1,087,004 describes a method whereby the high boiling liquids are replaced by organic breaching agents which are aliphatic, halogenated aliphatic, or saturated cycloaliphatic hydrocarbons boiling between 35° C. and 85° C. The low-boiling liquids are then removed by steam distillation. Finally, U.S. Pat. No. 4,158,572 dry mills the crude pigment, with or without salt, and then agitates the dry-milled pigment in an aqueous medium containing a surfactant.

The prior art procedures, represented by the aforesaid patents, utilize a dry milling of the crude pigment. This essentially valueless product is then followed by a further treatment using a liquid or wet-finishing step, and the finished pigment is isolated from the liquid medium. In all the cases mentioned, the liquids must be recovered to be economic. Therefore, no dry-grinding procedure, except the conventional, well-known dry-salt milling with sodium chloride or borax, etc., provides the required particle-size reduction and, even in this procedure, the inert salt must be washed from the pigment following the milling operation.

The present art-recognized procedures for reducing the particle size of crude copper phthalocyanine or quinacridone pigments, therefore, are expensive and time consuming and, in the case of salt grinding, severely restrict productivity.

Ideally, the crude pigment will be reduced in particle size by merely grinding the dry materials which may then be used directly in pigment applications. The present invention provides a composition and a dry-grinding procedure for reducing the particle size of crude copper phthalocyanine and quinacridone pigments comprising milling in the dry state, in the absence of the salt, to produce a pigment which may be used "as is" without any subsequent treatment, thereby providing convenience, economy, and enhanced productivity. Pigmentary properties of the resulting products are essentially equivalent to those obtained by other methods, including those described above.

The present invention describes a composition to be reduced in particle size of a crude copper phthalocyanine pigment or a crude quinacridone pigment, a hydroxylic compound preferably selected from water, lower aliphatic ($C_2$–$C_8$) diols, low-molecular weight (up to about 1000) polyalkylene ether glycols, and lower monoalkyl ($C_1$–$C_6$) ethers of lower aliphatic ($C_2$–$C_8$) diols, and a polar polymer preferably selected from polyvinylpyrrolidone and its alkyl derivatives, and copolymers of a major proportion of vinylpyrrolidone or its alkylated derivatives and one or more compatible, copolymerizable vinyl monomers, or polyacrylamide or acrylamide copolymers. The present invention further provides a process for the reduction in particle size of the above composition by dry milling it in an apparatus having attrition and shearing action for a period of time sufficient to reduce the particle size of the pigment to one micron or less and recovering from said apparatus a dry, free-flowing pigment composition.

Phthalocyanine pigments, as envisaged in this invention, include the substantially unsubstituted, chlorine-free copper phthalocyanines, particularly alpha-phase and beta-phase copper phthalocyanines. The term "phthalocyanine pigments" also includes products containing small amounts of chlorine as well as those containing amounts of chlorine up to the equivalent of one atom of chlorine per molecule of copper phthalocyanine. Likewise, the process is applicable to the particle-size reduction of phthalocyanines containing substituents other than chlorine in amounts up to the equivalent of one substituent per mole of copper phthalocyanine, as well as other phthalocyanines, such as metal-free phthalocyanine and the phthalocyanines of such metals as iron, nickel, cobalt, magnesium, lead, and vanadium.

Quinacridone pigments to which the process of the invention is applicable include crude linear quinacridone and substituted derivatives thereof, such as 4,11-dichloroquinacridone, 2,9-dichloroquinacridone, 2,9-dimethylquinacridone, 4,11-difluoroquinacridone, 2,9-dimethoxyquinacridone, and the like.

Preferred hydroxylic solvents, useful in the process of the present invention, include water, ethylene glycol, propylene glycol, butylene glycol, hexylene glycol, and the like, and mono($C_1$–$C_8$ alkyl)ethers thereof, such as monomethyl-, monoethyl- and monobutylethers of ethylene glycol, polyalkylene-ether glycols, such as polyethylene glycol 400, and the like. Most preferred hydroxylic solvents include water and ethylene glycol. The amount of hydroxylic solvent used in the composition will generally range from about 1.5 to 10 parts by weight per hundred parts by weight of crude dry pigment. Preferably, about 3 to 5 parts by weight per hundred parts by weight of crude dry pigment is used.

The preferred polar polymers, which are useful in combination with the aforementioned preferred hydroxylic solvents, include polyvinylpyrrolidone and alkyl derivatives thereof and copolymers of vinylpyrrolidone or its alkylated derivatives with other compatible, copolymerizable vinyl monomers, such as vinyl acetate, styrene, and the like, wherein vinylpyrrolidone is in major proportion. Also useful are polyacrylamide and copolymers thereof with other vinyl monomers. A particularly useful acrylamide polymer is a high-molecular-weight (~300,000) partially hydrolyzed polyacrylonitrile. A most preferred polar polymer is polyvinylpyrrolidone having a molecular weight of about 40,000, although the molecular weight may range from about 10,000 to 100,000 or more. The amount of polymer used in the process of the invention may range from about 2 to 20 parts by weight per hundred parts by weight of crude dry pigment. Preferably, about 6 to 12 parts by weight, same basis, is used.

Generally, in accordance with the present invention, the crude dry pigment is charged to an apparatus having attrition and shearing action, such as a conventional ball mill, along with steel balls, rods, etc. Ordinarily, the ratio (wt) of balls to organic pigment is about 20/1, but may range from about 5–50/1. Then, the hydroxylic solvent is added, followed by the polar polymer. The order of addition is not critical, however. The ball mill is then sealed and rolled for a period of time sufficient to reduce the particle size of the pigment to less than about one micron.

Generally, about 2 to 24 hours is sufficient, although longer times may be used. The time of agitation is not critical, so long as the time is sufficient to achieve the desired particle-size reduction. The milling may be done at ambient temperatures to as high as about 100° C. and may be done at atmospheric or superatmospheric pressure.

It is a distinctive feature of the present invention that the milling be done in the dry state, that is, there is never a fluid state during the milling. The reduced pigment, following milling, is a dry powder which is used "as is" without further treatment.

In the examples which follow, crude dry copper phthalocyanine pigment is treated in accordance with the process of the invention and compared with a standard copper phthalocyanine pigment, obtained by conventional salt milling techniques, in an aqueous flexographic ink. The ink (all parts are by weight) is prepared as follows:

A grinding vehicle is made by composing Solution 1 and Solution 2:

| Solution 1 |
|---|
| Weigh into a suitable container: |
| 20.6 Pt. Amberol 750 (Rohm & Haas) |
| 19.4 Pt. Ethanol |
| 1.5 Pt. Morpholine |
| 41.5 Pt. |

| Solution 2 |
|---|
| Weigh into a suitable container: |
| 5.0 Pt. Cellosolve |
| 50.0 Pt. Distilled water |
| 1.0 Pt. 28% Ammonium hydroxide |
| 2.5 Pt. Urea |
| 58.5 Pt. |

Combine Solutions 1 and 2, with stirring, and adjust the pH to 8.3 with ammonium hydroxide
A 1-pint jar is charged with:
 45 Pt. Pigment
 126 Pt. Above vehicle
 29 Pt. Water
 500 Pt. ½" Arlcite (grinding agent)
This composition contains 22.5% pigment.

The jar is capped and rolled at a speed of 85–90 rpm for 16–20 hours and the contents then strained from the grinding medium into a suitable vessel. The pH is adjusted to 8.3 with ammonium hydroxide.

Tints are prepared by mixing 8.88 parts of the colored ink with 44.4 parts of white ink (ratio 1/10 colored/$TiO_2$ ink) and mixing on a shaker.

Drawdowns of the colored ink and the tints against a standard colored ink (using copper phthalocyanine blue prepared by conventional means) are made on Kraft stock paper and on white sulfite bond paper, such as Plover Bond Substance 20 long. The drawdowns of the tints are rated for tinting strength and shade versus standard.

In the following examples all parts and percents are by weight unless otherwise specified.

EXAMPLE 1

A 16-gallon steel ball mill containing 150 lbs. of 2-inch steel balls was charged with 15 lbs. of crude (92% real) dry cropper phthalocyanine blue, 680 grams of polyvinylpyrrolidone (mol wt ~40,000) and 340 grams of ethylene glycol. The dry, free-flowing mixture was rolled for 17 hours at a temperature of 90°–95° C. and then discharged from the mill. When compared "as is" with a standard copper phthalocyanine pigment in the aforementioned aqueous flexographic ink, the strength was 103% of the standard and considerably redder.

EXAMPLE 2

The procedure of Example 1 was repeated except that the ethylene glycol was replaced by an equal weight of water and the mixture was rolled for 44 hours at 50°–60° C. When the product was compared "as is " with the standard in the aqueous flexographic ink, the strength was 104% of the standard and much redder.

EXAMPLE 3

A 1-quart polyethylene bottle was charged with 2100 grams of ⅜" steel balls, 55 grams of crude (92% real) copper phthalocyanine blue, and 3.0 grams of water. The mixture was rolled for 48 hours and the resulting powder separated from the steel balls through a 10-mesh screen. When the pigment was compared "as is" in the aqueous flexographic ink with a standard pigment, it exhibited only 40% of the strength and was much dirtier.

EXAMPLE 4

The procedure of Example 3 was followed except that (a) 9 grams and (b) 12 grams of polyvinylpyrrolidone (mol wt ~40,000) was added instead of the water. The mixture was rolled for 24 hours and discharged. When compared "as is" in the aqueous flexographic ink with a standard copper phthalocyanine pigment, it exhibited (a) only 40% and (b) only 30% of the strength of the standard and was much dirtier in both instances.

EXAMPLE 5

The procedure of Example 1 was followed except that the polyvinylpyrrolidone was omitted and only 340 grams of ethylene glycol was added to the mill along with the crude pigment. When the milled pigment was compared "as is " in the aqueous flexographic ink with a standard pigment, it exhibited only 50% of the strength of the standard and was redder and much dirtier.

Examples 1-5 illustrate that when crude copper phthalocyanine is milled in accordance with the invention (Examples 1 and 2) the resulting pigment is equivalent to or slightly better than a standard pigment, obtained by conventional means, in an aqueous flexographic ink. The examples also illustrate that neither water, ethylene glycol, nor polyvinylpyrrolidone, used alone, will effect the required particle-size reduction to produce a good pigment.

EXAMPLE 6

The procedure of Example 3 was repeated except that the water was replaced with respectively (a) 3.0 g. cellosolve and (b) 3.0 g. butyl cellosolve and each mixture was rolled for 24 hours. When the products were compared in the aqueous flexographic ink with a standard pigment, each exhibited only 50% of the strength and were much dirtier.

EXAMPLE 7

The procedure of Example 6 (b) was repeated except that 6.0 g. polyvinylpyrrolidone was added with the butyl cellosolve. When the pigment was compared "as is " in the aqueous flexographic ink with a standard pigment, the strength was 90% and much redder.

EXAMPLE 8

The procedure of Example 2 was repeated except that water was replaced with 375 g. of cellosolve (ethylene glycol monoethyl ether) and the mixture was rolled for 42 hours. When compared "as is" with the standard in the aqueous flexographic ink, the strength was 95% and moderately redder.

EXAMPLE 9

The procedure of Example 3 was repeated except that 3.0 g. of a partially hydrolyzed polyacrylonitrile, having a molecular weight of about 300,000, was added instead of the water. The mixture was rolled for 24 hours and discharged. When compared "as is" in the aqueous flexographic ink with a standard pigment, it exhibited only 50% of the strength of the standard and was much dirtier.

EXAMPLE 10

The procedure of Example 9 was followed except that 3.0 g. water was added with the polymer. When compared "as is" with the standard in the aqueous flexographic ink, the strength was 92% and much redder.

Examples 6-10 illustrate that when crude copper phthalocyanine is milled in accordance with the invention (Examples 7, 8, 10) the resulting pigment is essentially equivalent to the standard pigment, obtained by conventional means, in an aqueous flexographic ink. The examples also illustrate that neither lower alkyl ethers of ethylene glycol nor an acrylamide polymer, used alone, will effect the required particle-size reduction.

What is claimed is:

1. A process for the reduction of the particle size of a quinacridone pigment or a phthalocyanine pigment containing statistically up to about one substituent per molecule which comprises dry milling one hundred parts by weight of a crude dry pigment in an apparatus having attrition and shearing action with (a) from about 1.5 to 10 parts by weight of a hydroxylic solvent and (b) from about 2 to 20 parts by weight of a polar polymer, for a period of time sufficient to reduce the particle size of said crude pigment to one micron or less and recovering from said apparatus a dry, free-flowing pigment composition.

2. The process of claim 1 wherein the hydroxylic solvent is selected from the group consisting essentially of water, aliphatic ($C_2$–$C_8$) diols, polyalkylene ether glycols of molecular weight up to about 1000, and monoalkyl ($C_1$–$C_6$) ethers of aliphatic ($C_2$–$C_8$) diols, and the polar polymer is selected from the group consisting essentially of homopolymers of vinylpyrrolidone or its alkylated derivatives, copolymers of a major proportion of vinylpyrrolidone or its alkylated derivatives with one or more compatible copolymerizable vinyl monomers, homopolymers of acrylamide, and copolymers of acrylamide with one or more compatible copolymerizable vinyl monomers.

3. The process of claim 1 wherein said hydroxylic solvent is water and said polar polymer is polyvinylpyrrolidone.

4. The process of claim 1 wherein said hydroxylic solvent is ethylene glycol and said polar polymer is polyvinylpyrrolidone.

5. The process of claim 1 wherein said hydroxylic solvent is water and said polar polymer is a polymer of acrylamide.

* * * * *